Feb. 19, 1957  G. J. WOODS  2,782,276
IGNITION CUT-OFF DEVICE
Filed March 15, 1954  2 Sheets-Sheet 1
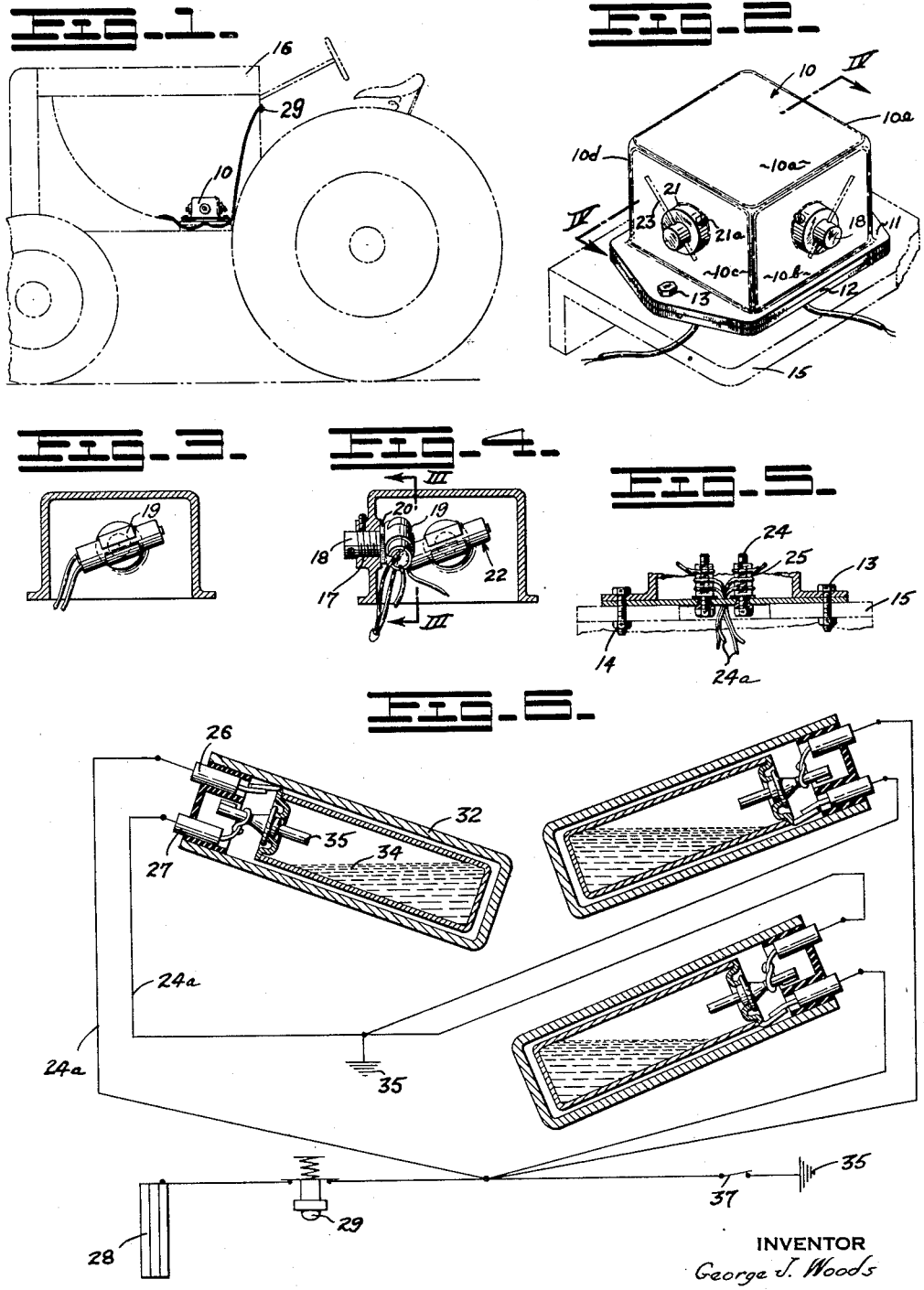
INVENTOR
George J. Woods
BY Winston E. Miller
ATTORNEY

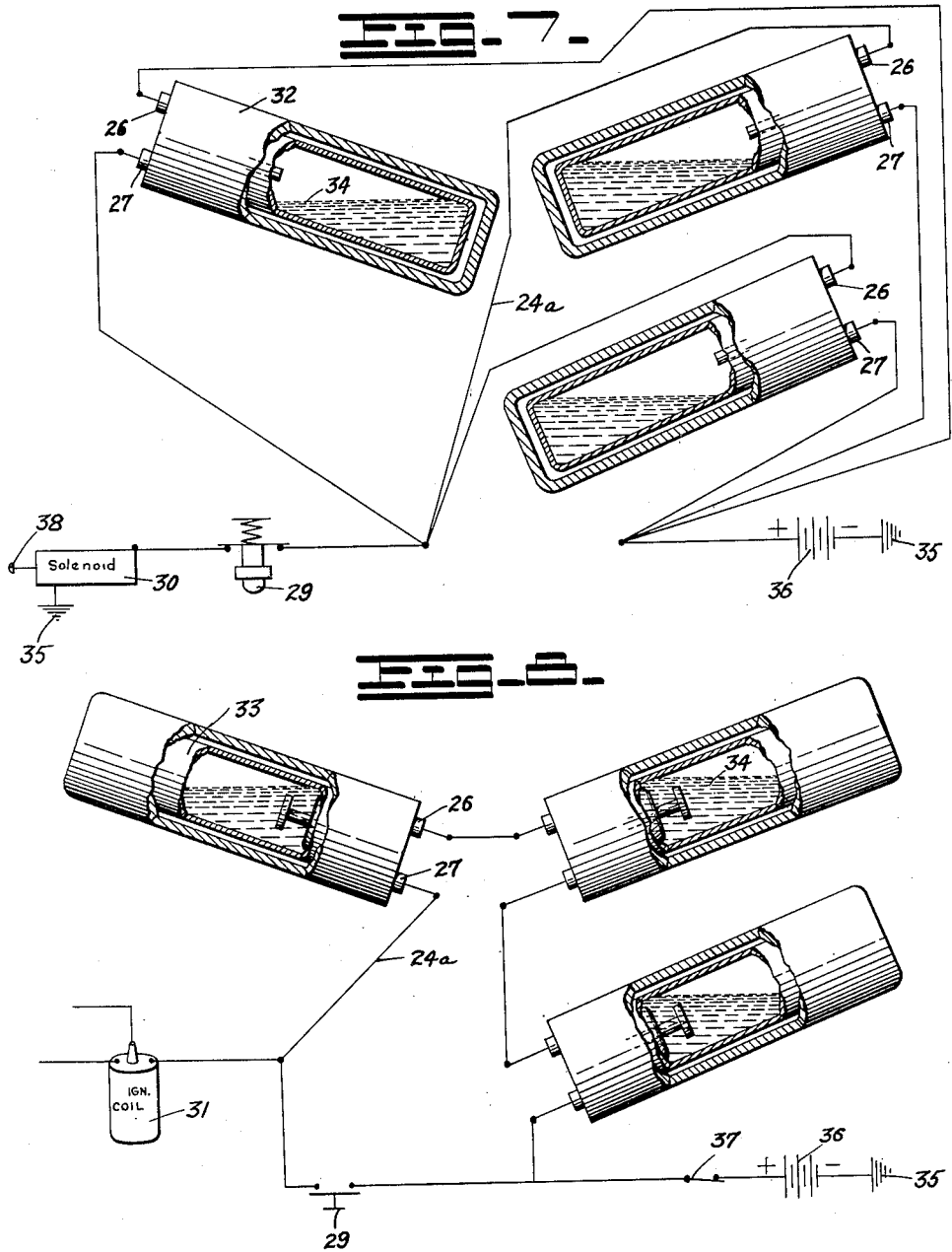

United States Patent Office 2,782,276
Patented Feb. 19, 1957

2,782,276
IGNITION CUT-OFF DEVICE
George J. Woods, Omer, Mich.

Application March 15, 1954, Serial No. 416,163

1 Claim. (Cl. 200—61.47)

This invention relates to an improved device for use with tractors and the like for automatically shutting-off the ignition system and engine when the vehicle tilts to an angle exceeding a pre-set amount.

It is an object of the present invention to provide an improved safety device whose operation may be manually controlled and that is simply adjusted and trouble-free in operation.

Further objects of the invention include the provision of a device having inherent protective features adapting it for use in all types of weather; and the provision of a device that may be used, with slight modifications, on vehicles having different varieties of electrical systems, including diesel engine, battery and magneto ignitions.

The above being among the objects of the present invention the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a side elevational view of the ignition cut-off device mounted on the frame of a conventional tractor;

Figure 2 is a perspective view of the ignition cut-off device showing the support structure for mounting on the vehicle;

Figure 3 is a sectional view of the ignition cut-off device taken on line III—III of Figure 4;

Figure 4 is a sectional view of the ignition cut-off device taken on line IV—IV of Figure 2;

Figure 5 is a sectional view showing the interior terminal connections for the device;

Figure 6 is an enlarged sectional view of the three mercury switches contained in the device and indicates schematically the electrical circuit for use in a magneto ignition system;

Figure 7 is an enlarged partially broken, partially sectional view of the three mercury switches contained in the device and indicates schematically the electrical circuit for use with a diesel engine; and Figure 8 is an enlarged partially broken, partially sectional view of the three mercury switches contained in the device and indicates schematically the electrical circuit for use in a battery ignition system.

Referring now to the drawings, the housing 10, illustrated in Figures 1 and 2, is a box-shaped structure having a top 10a and sides 10b, 10c, 10d and 10e. The open edges of each of the sides are welded or otherwise affixed to a plate 11, which in turn is adapted to fit a base 12. The unit is fastened by the bolts 13 and the nuts 14 to the support 15, which is secured to the frame of the tractor 16 in a conventional manner. Centrally positioned on each of the sides 10b, 10c and 10d is an opening 17 which provides threadable seating for the threaded shaft 18 that is connected to the bracket 19. A washer 20 is positioned between the shaft 18 and the bracket 19 and separates the bracket from the flange 21 on either side of the openings 17 on the sides 10b, 10c and 10d. A lock screw 21a is provided for angularly positioning the bracket 19 and the mercury switch 22 that is supported thereby. A scale, not shown, is fastened on each of the sides 10b, 10c and 10d and is adapted for use with the indicator 23 to determine the degree of angle that each of the mercury switches are set.

In Figure 5 I have indicated the terminal assembly for the various electrical connections to the mercury switches 22. The posts 24 are insulated from the base 12 and the wires 24a are supported by the insulating nuts 25.

In Figures 6, 7 and 8 I have shown enlarged mercury switches and the respective electrical connections for magneto ignition systems, diesel engine systems and battery ignition systems. In Figures 6 through 8 the numeral 26 refers to the negative pole of the mercury switch and the numeral 27 refers to the positive pole. In each of Figures 6 through 8 conventional wire connections are shown, and numeral 28 refers to a magneto, numeral 29 to a push-button switch, numeral 30 to a solenoid, and numeral 31 to an ignition coil. Each of the mercury switches 22 are of conventional manufacture and in addition to the negative and positive poles, comprise a housing 32 for supporting a metallic casing 33 having mercury 34 disposed therein.

The ground connection is indicated by the numeral 35 and the numeral 36 refers to a battery for energizing the electrical system. The numeral 37 designates the ignition switch on the vehicle and the numeral 38 denotes a plunger for use in connection with the solenoid 30. The plunger 38 is connected through suitable linkage with the throttle on the engine and closes the throttle when the solenoid is energized.

As will be understood by those skilled in the art, the respective mercury switches may be suitably positioned by the operator in order to open the electrical circuit at any designated angle of tilt of the vehicle. For example, should the operator desire, he might set one mercury switch at an angle of 27 degrees and the remaining two switches at angles of 30 degrees. In relation to the designated circuit, the vehicle upon tilting to an angle exceeding the pre-set positions would automatically cause the electrical circuit to open and correspondingly cause the vehicle engine to stop.

Assuming that the vehicle has exceeded a safe tilting angle the operator has only to again close the electrical circuit by pressing the switch 29, thereby enabling him to move the vehicle to safer ground.

In accordance with the patent statutes, I have described the principles of construction and operation of the device, and while I have endeavored to set forth the best embodiment thereof, I desire it to be understood that obvious changes may be made within the scope of the following claim without departing from the spirit of my invention.

I claim:

In an ignition cut-off device for mounting on a vehicle, the combination of a housing having threaded openings on each of three sides, a bracket, and a threaded shaft in each of said openings in integral association with said bracket, a mercury switch in supported relationship with said bracket, means whereby upon turning said shaft said mercury switch is positioned for controlling the opening and closing of an electrical circuit in said vehicle.

References Cited in the file of this patent
UNITED STATES PATENTS

| | | |
|---|---|---|
| 1,519,079 | Whiting | Dec. 9, 1924 |
| 2,101,837 | Blanchett | Sept. 5, 1939 |
| 2,451,107 | McCabe | Oct. 12, 1948 |
| 2,453,783 | Claypool | Nov. 16, 1948 |
| 2,541,571 | Clapp | Feb. 13, 1951 |